United States Patent
Frodsham et al.

(10) Patent No.: US 7,519,846 B2
(45) Date of Patent: Apr. 14, 2009

(54) DETECTION OF AN IN-BAND RESET

(75) Inventors: Timothy Frodsham, Portland, OR (US); Zale T Schoenborn, Portland, OR (US); Sanjay Debral, Palo Alto, CA (US); Muraleedhara H. Navada, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 11/321,214

(22) Filed: Dec. 28, 2005

(65) Prior Publication Data

US 2007/0173215 A1  Jul. 26, 2007

(51) Int. Cl.
*G06F 1/04* (2006.01)
(52) U.S. Cl. ............... 713/502; 714/55; 377/44; 327/151
(58) Field of Classification Search ........ 713/500, 713/502; 455/158.3; 714/55; 377/44; 327/151
See application file for complete search history.

(56) References Cited

U.S. PATENT DOCUMENTS

| | | | | |
|---|---|---|---|---|
| 5,301,306 A | * | 4/1994 | Plog | 713/501 |
| 5,377,347 A | * | 12/1994 | Hiiragizawa et al. | 713/502 |
| 6,525,979 B2 | * | 2/2003 | Kato | 365/210.1 |
| 6,891,401 B2 | * | 5/2005 | Starr et al. | 327/18 |

* cited by examiner

*Primary Examiner*—Thuan N Du
(74) *Attorney, Agent, or Firm*—Blakely, Sokoloff, Taylor & Zafman LLP

(57) ABSTRACT

Methods and apparatuses for detecting an in-band reset using digital circuitry. A first counting circuit is coupled to receive a first clock signal and to generate output signals based on a number of cycles of the first clock signal. A second counting circuit is coupled to receive a second clock signal and the output signals from the first counting circuit. The second counting circuit generates output signals based on number of cycles of the second clock signal. A comparison circuit is coupled with to receive the output signals of the second counting circuit and to generate a reset signal if the output signals from the second counting circuit correspond to a pre-selected range.

18 Claims, 5 Drawing Sheets

DETECTION OF AN IN-BAND RESET

TECHNICAL FIELD

Embodiments of the invention relate to a physical layer interface of a computing system. More particularly, embodiments of the invention relate to techniques for detecting an in-band reset signal in a physical layer interface of a computing system.

BACKGROUND

Computing systems may be reset, or include one or more components or sub-systems that may be reset, by an external signal received via a physical layer interface. On technique for communicating an in-band reset is to halt a clock signal provided to a physical layer interface. Currently, detection of absence of a clock signal is accomplished using relatively complex analog circuitry.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Figure 1:
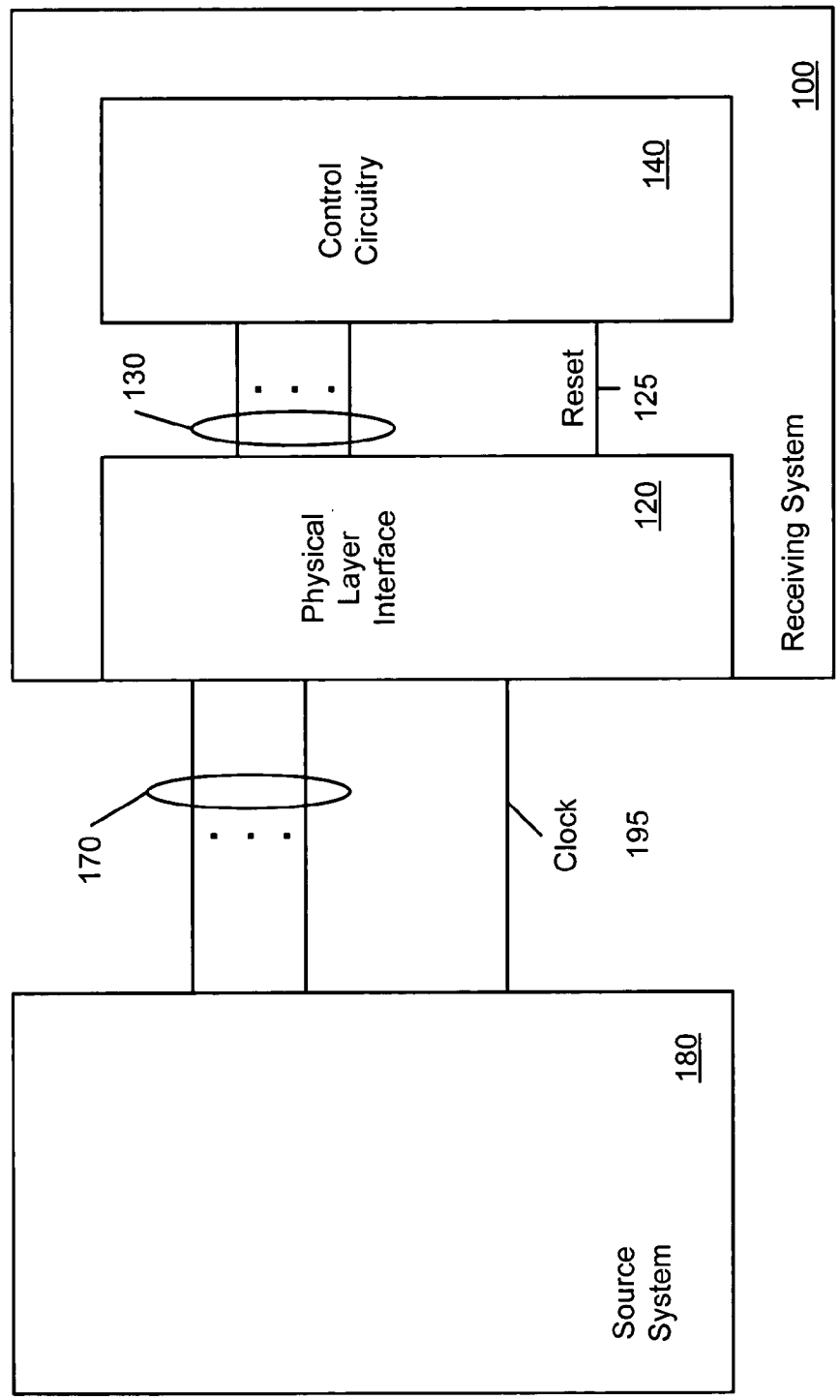
FIG. 1 is a block diagram of one embodiment of a source system that may provide signals including a clock signal to a receiving system.

FIG. 1 is a block diagram of one embodiment of a source system that may provide signals including a clock signal to a receiving system. Source system 180 and receiving system 100 may be components of a single electronic device (e.g., computer system) or may be components of separate electronic devices (e.g., a debug platform and a computer system).

Source system 180 may include any type of electronic or other components that allow signals 190 and clock signal 195 to be transmitted to receiving system 100. Physical layer interface 120 may include the physical connection to the signal lines that carry signals 190 and clock signal 195. Physical layer interface 120 may include any type of interface circuitry known in the art in addition to the various embodiments of circuitry to detect in-band resets as described herein.

In one embodiment, physical layer interface 120 may provide signals 130 as well as reset signal 125 to control circuitry 140. Control circuitry 140 may include any type of circuitry to provide functionality in response to signals 130 and/or reset signal 125. Additional and/or different components may also be included in receiving system 100.

Figure 2:
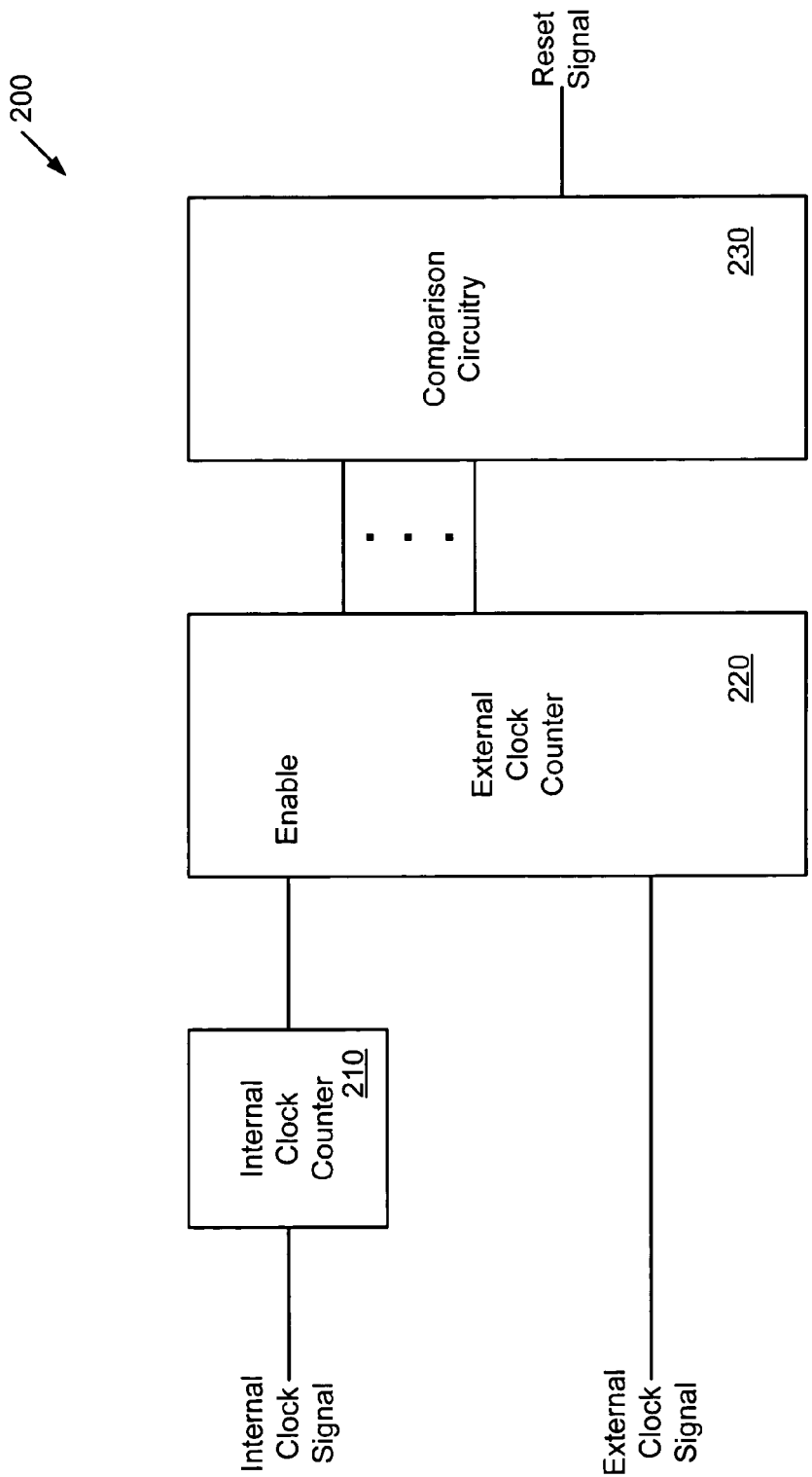
FIG. 2 is a block diagram of one embodiment of digital circuitry to detect an in-band reset by detecting the halting of a clock signal.

FIG. 2 is a block diagram of one embodiment of digital circuitry to detect an in-band reset by detecting the halting of a clock signal. The example circuit of FIG. 2 allows for detection of absence of a clock signal utilizing relatively simple digital circuitry. Use of the digital circuitry may allow for less complex and/or smaller circuitry to detect in-band reset as compared to analog circuitry for detection of in-band reset.

In one embodiment, internal clock counter 210 may be coupled to receive an internal clock signal. The internal clock signal may be generated by, for example, a circuit in a component in which the digital circuitry of FIG. 2 may be included. The internal clock signal may be generated by any appropriate component and is not required to be internal to any specific system component. Internal clock counter 210 may count cycles of the internal clock signal and generate an output signal based on the number of internal clock signal cycles received.

In one embodiment, internal clock counter 210 may enable the output signal for periods of time corresponding to a pre-selected number (e.g., 20, 25, 50) of internal clock signal cycles. The number of clock cycles for which the output signal is enabled may be selected based, at least in part, on, for example, the ratio of the internal clock signal to the external clock signal, the slack specified between the internal clock signal and the external clock signal, the asynchronous nature of the clock domains, etc. In one embodiment, the internal clock signal is approximately 2.0 GHz and the external clock signal is approximately 3.2 GHz.

When external clock counter 220 is enabled by the output signal from internal clock counter 210, external clock counter 220 may count cycles of the external clock signal. Because the frequency of the internal clock signal is known, external clock counter 220 is enabled for a known period of time. During that known period of time, if the external clock signal is functional a known number of clock cycles will be counted.

In one embodiment, external clock counter 220 may generate a multi-bit output signal that corresponds to the number of external clock signal cycles counted during the time period that external clock counter 220 is enabled by the output signal of internal clock counter 210. Comparison circuitry 230 may compare the multi-bit output signal from external clock counter 220 to a pre-selected range (e.g., 28 to 36, 30 to 33). In one embodiment, if the output of external clock counter 220 is within the expected range, the external clock signal is considered operational. However, if the output of external clock counter 220 is not within the expected range, the external clock signal may be considered suspended and a reset signal may be generated. The reset signal may be used, for example, to reset a point-to-point link connection, or for another purpose.

Figure 3:
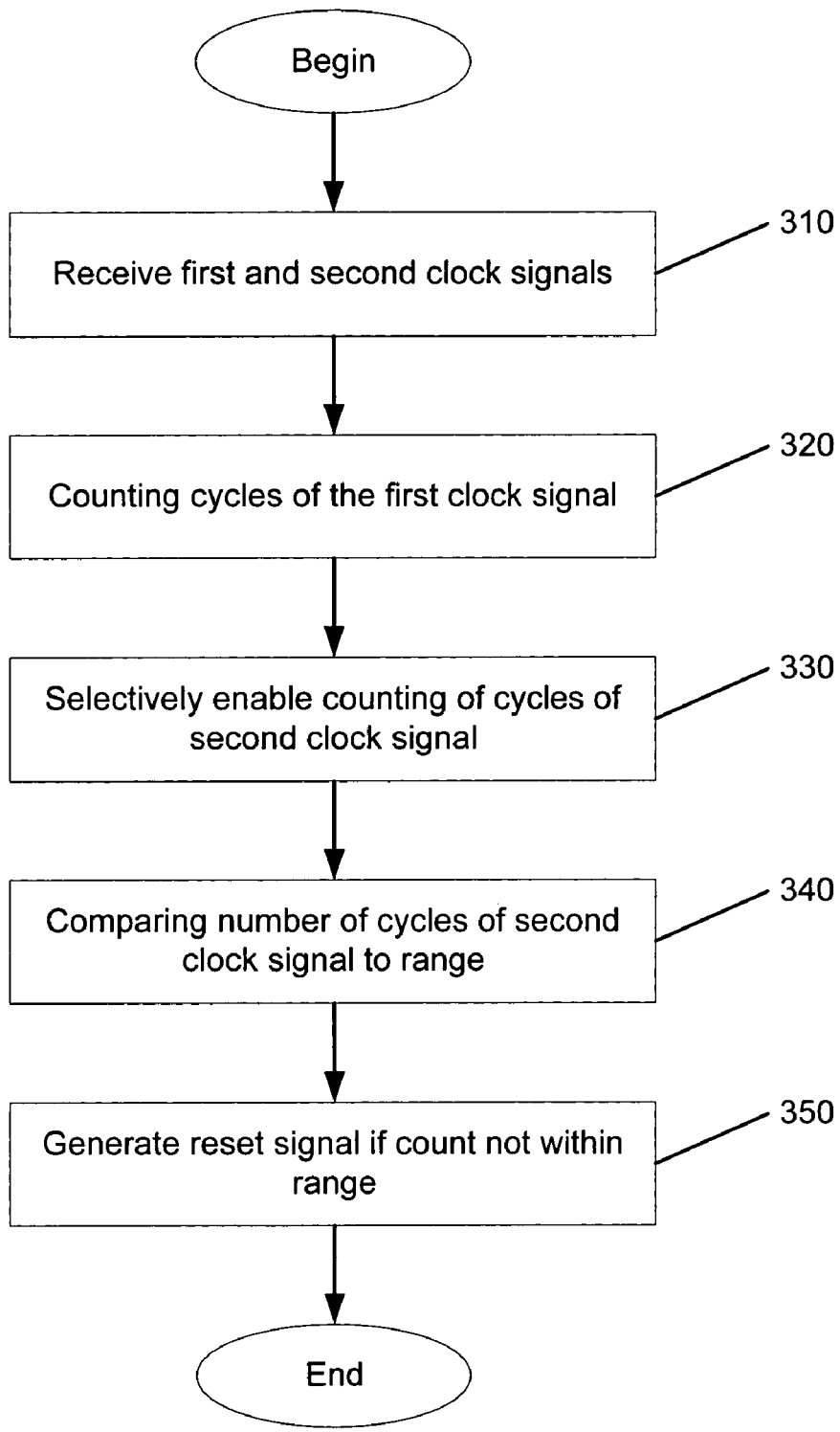
FIG. 3 is a flow diagram of one embodiment of a technique to detect an in-band reset using digital circuitry.

FIG. 3 is a flow diagram of one embodiment of a technique to detect an in-band reset using digital circuitry. First and second clock signals are received, 310. As described above, one clock signal may be received from a remote component/device via a physical link interface. In one embodiment, the physical interface is a point-to-point interface that may connect a receiving component/device with a sending component/device. In one embodiment, suspension of the clock signal from the sending component/device may be used to indicate an in-band reset, which may cause a reset of the point-to-point link.

Cycles of the first clock signal may be counted, 320. In one embodiment, a digital counter may be used to count cycles of the first clock signal, which may be an internal clock signal or any other reference clock signal having a known frequency. The counter may generate an output signal corresponding to windows of time determined in terms of the first clock signal. For example, the output signal may be asserted for a preselected number of cycles of the first clock signal, deasserted for a period of time and then asserted again for the preselected number of cycles of the first clock signal.

Counting of cycles of the second clock signal may be selectively enabled, 330. In one embodiment, when the output signal described above is asserted, cycles of the second, or external clock signal, may be counted. In one embodiment, cycles of the second clock signal may be counted using a digital counter that may generate a multi-bit output signal corresponding to a number of clock cycles of the second clock signal counted when counting is enabled.

The number of cycles of the second clock signal counted may be compared with a range of expected number of clock cycles, 340. Because the time period for which counting cycles of the second clock signal is known and the frequency of the second clock signal is known, a number of expected clock cycles may be determined. If the number of counted clock cycles does not fall within an acceptable range, a reset signal may be generated, 350.

Figure 4:
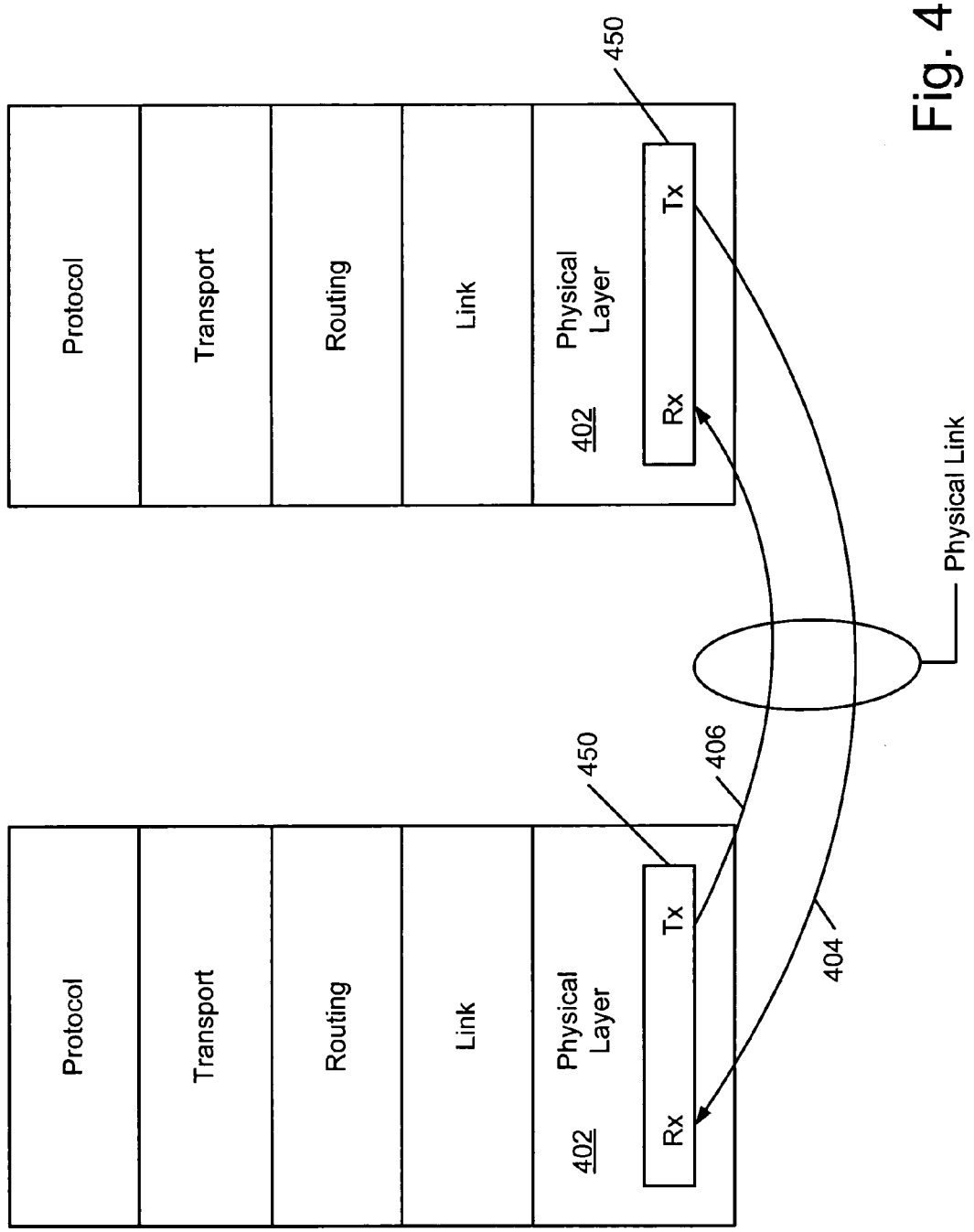
FIG. 4 is a block diagram of one embodiment of an apparatus for a physical interconnect.

FIG. 4 is a block diagram of one embodiment of an apparatus for a physical interconnect. In one aspect, the apparatus depicts a physical layer for a cache-coherent, link-based interconnect scheme for a processor, chipset, and/or 10 bridge components. For example, the physical interconnect may be performed by each physical layer of an integrated device. Specifically, the physical layer may provide communication between two ports over a physical interconnect comprising two uni-directional links. Specifically, one uni-directional link 404 from a first transmit port 450 of a first integrated device to a first receiver port 450 of a second integrated device. Likewise, a second uni-directional link 406 from a first transmit port 450 of the second integrated device to a first receiver port 450 of the first integrated device. However, the claimed subject matter is not limited to two uni-directional links.

Figure 5:
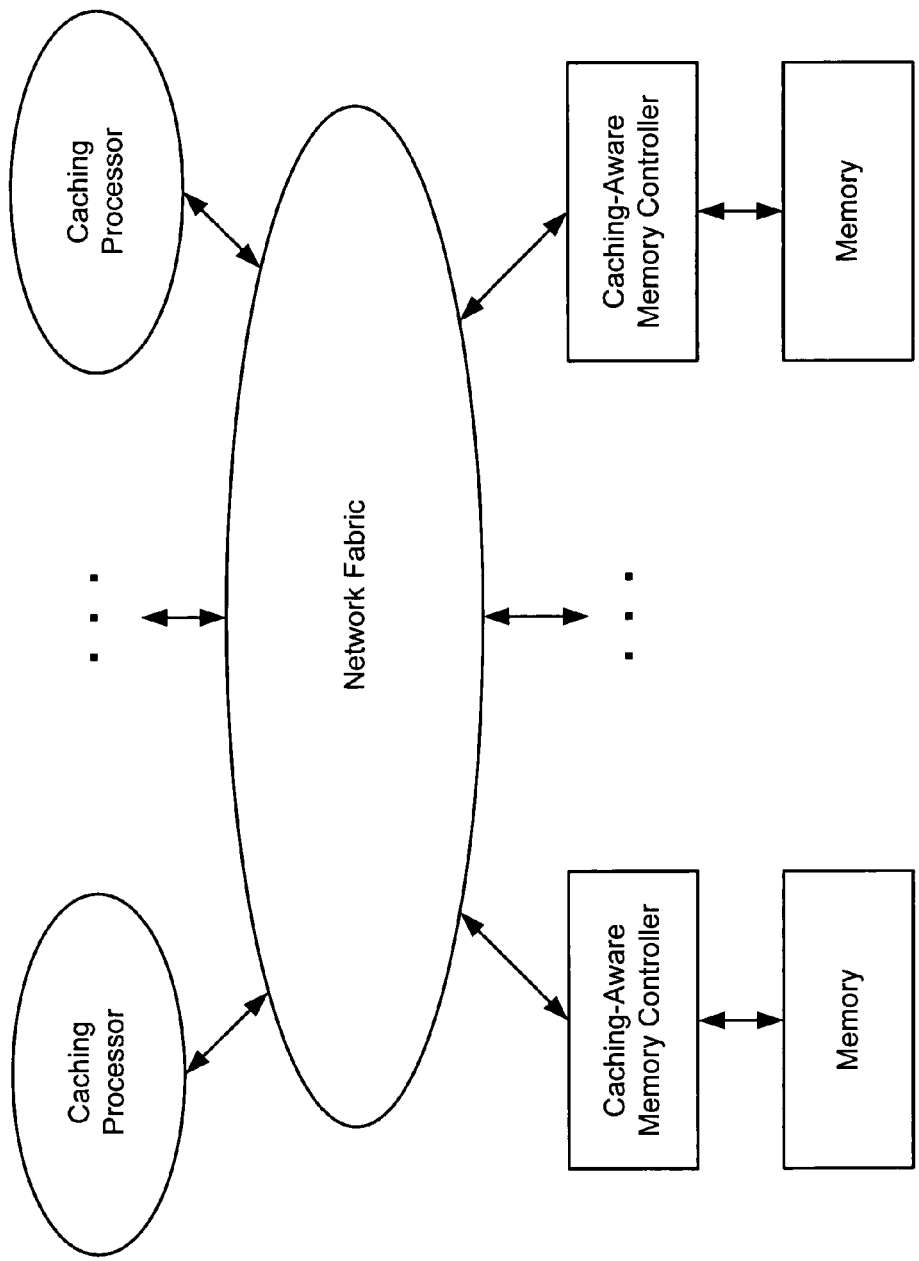
FIG. 5 is a conceptual illustration of one embodiment of a system that may utilize point-to-point interconnects that may carry in-band reset signals.

FIG. 5 is a conceptual illustration of one embodiment of a system that may utilize point-to-point interconnects that may carry in-band reset signals. In one embodiment, the system of FIG. 5 may utilize a point-to-point architecture that supports a layered protocol scheme. In one embodiment, the system may include a plurality of caching agents and home agents coupled to a network fabric. For example, the network fabric may adhere to a layered protocol scheme and comprised of: a physical layer, a link layer, a routing layer, a transport layer and a protocol layer (as depicted in connection with FIG. 4). The fabric may facilitate transporting messages from one protocol (home or caching agent) to another protocol for a point-to-point network.

FIG. 5 is a high level, simplified abstraction of a protocol architecture that may utilize one or more point-to-point links. The fabric may facilitate transporting messages from one protocol (caching processor or caching aware memory controller) to another protocol for a point-to-point network. Each caching-aware memory controller may be coupled with memory that may include, for example, dynamic random access memory (DRAM), flash memory, or any other type of memory known in the art.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
 a first counting circuit coupled to receive a first clock signal and to generate one or more output signals based, at least in part, on a number of cycles of the first clock signal;
 a second counting circuit coupled to receive a second clock signal and to the first counting circuit to receive the one or more output signals from the first counting circuit to generate one or more output signals based, at least in part, on a number of cycles of the second clock signal; and
 a comparison circuit coupled with to receive the one or more output signals of the second counting circuit and to generate a reset signal if the one or more output signals from the second counting circuit correspond to a preselected range.

2. The apparatus of claim 1 wherein the first clock signal comprises a clock signal internal to a device receiving the second clock signal.

3. The apparatus of claim 1 wherein absence of the second clock signal corresponds to an in-band reset.

4. The apparatus of claim 1 wherein the second counting circuit is coupled with a physical interface of a point-to-point link in which absence of the second clock signal indicates a reset condition.

5. The apparatus of claim 1 wherein a point-to point link connection is reset in response to the reset signal.

6. A method comprising:
 monitoring cycles of a first clock signal with a first counting circuit;
 selectively enabling counting of a second clock signal with a second counting circuit coupled to the first counting circuit based, at least in part, on the monitoring of the first clock signal;
 comparing the counting of the second clock signal to a pre-selected range; and
 generating a reset signal based, at least in part, on the comparison.

7. The method of claim 6 wherein the first clock signal comprises a clock signal internal to a device receiving the second clock signal.

8. The method of claim 6 wherein absence of the second clock signal corresponds to an in-band reset.

9. The method of claim 6 wherein the second clock signal is received via a physical interface of a point-to point link in which absence of the second clock signal indicates a reset condition.

10. The method of claim 6 further comprising resetting a point-to point link connection is reset in response to the reset signal.

11. A system comprising:
 a first counting circuit coupled to receive a first clock signal and to generate one or more output signals based, at least in part, on a number of cycles of the first clock signal;
 a second counting circuit coupled to receive a second clock signal and to the first counting circuit to receive the one or more output signals from the first counting circuit to generate one or more output signals based, at least in part, on a number of cycles of the second clock signal;

a comparison circuit coupled with to receive the one or more output signals of the second counting circuit and to generate a reset signal if the one or more output signals from the second counting circuit correspond to a pre-selected range; and a dynamic random access memory (DRAM) coupled to the comparison circuit.

12. The system of claim 11 wherein the first clock signal comprises a clock signal internal to a device receiving the second clock signal.

13. The system of claim 11 wherein absence of the second clock signal corresponds to an in-band reset.

14. The system of claim 11 wherein the second counting circuit is coupled with a physical interface of a point-to-point link in which absence of the second clock signal indicates a reset condition.

15. The system of claim 11 wherein a point-to-point link connection is reset in response to the reset signal.

16. An apparatus comprising:
means for monitoring cycles of a first clock signal with a first counting circuit;

means for selectively enabling counting of a second clock signal with a second counting circuit coupled to the first counting circuit based, at least in part, on the monitoring of the first clock signal;

means for comparing the counting of the second clock signal to a pre-selected range; and means for generating a reset signal based, at least in part, on the comparison.

17. The apparatus of claim 16 wherein the second clock signal is received via a physical interface of a point-to-point link in which absence of the second clock signal indicates a reset condition.

18. The apparatus of claim 16 further comprising means for resetting a point-to-point link connection is reset in response to the reset signal.

* * * * *